Figure 1:
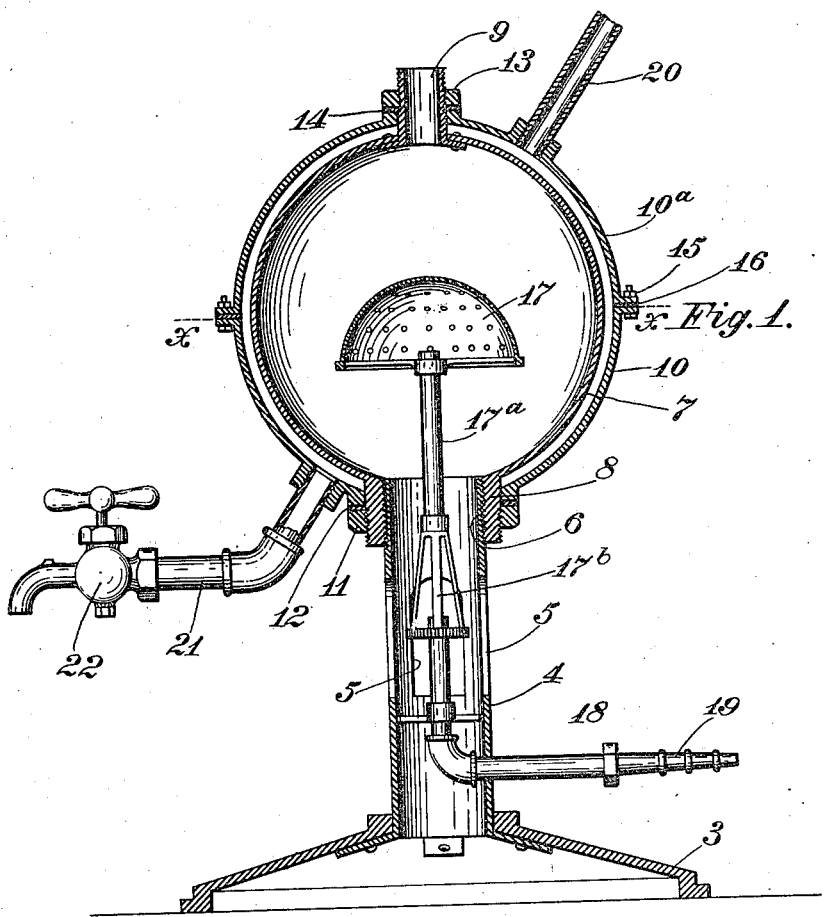

L. C. RHEA.
WATER HEATER.
APPLICATION FILED NOV. 19, 1909.

963,177.

Patented July 5, 1910

Witnesses
Benj. Finckel
Mayme Toard

Inventor
Luther C. Rhea
by Fincate Fincate
his Attorneys

UNITED STATES PATENT OFFICE.

LUTHER C. RHEA, OF COLUMBUS, OHIO.

WATER-HEATER.

963,177.

Specification of Letters Patent.  Patented July 5, 1910.

Application filed November 19, 1909. Serial No. 528,877.

*To all whom it may concern:*

Be it known that I, LUTHER C. RHEA, a citizen of the United States, residing at Columbus, in the county of Franklin and State of Ohio, have invented a certain new and useful Improvement in Water-Heaters, of which the following is a specification.

The object of this invention is to provide a device of simple and cheap construction for the rapid and economical heating of water.

The invention is embodied in the construction herein shown and described, the invention not being confined to the precise details of construction particularly depicted in the drawings.

Figure 2:
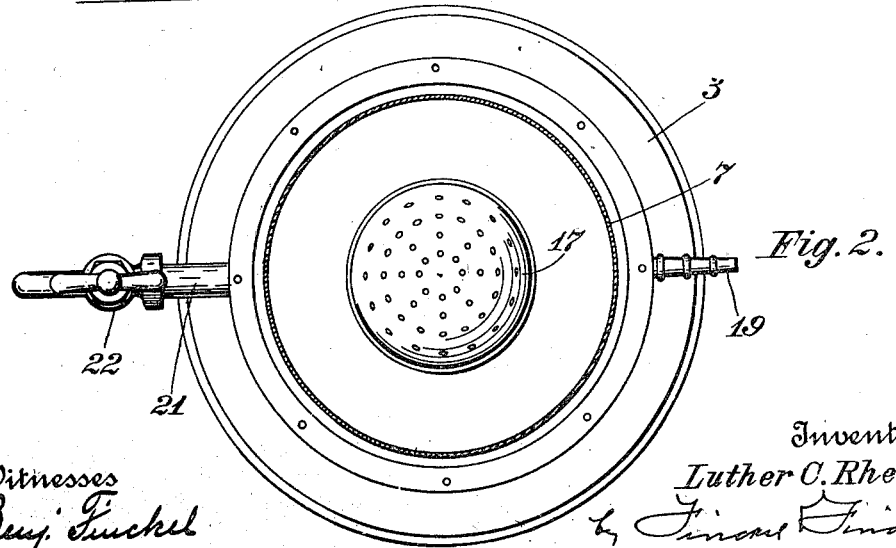

In said drawings: Figure 1 is a vertical section and Fig. 2 a horizontal section on the line $x$—$x$ Fig. 1.

In the views 3 designates a suitable base from which is erected a tubular standard 4 having lateral openings 5, and an externally threaded upper end 6.

The character 7 designates a hollow sphere of suitable metal having a tubular boss 8 threaded internally to be connected with the upper end of the tubular standard 4. The upper end of the sphere 7 is provided with a vent tube 9. The sphere 7 is jacketed with another larger hollow sphere of suitable metal concentric with reference thereto so as to provide a thin continuous water receiving chamber of spherical form between them. The outer sphere is comprised of a lower hemisphere 10 supported by a nut 11 threaded on the exterior of the boss 8 a washer 12 being interposed between the nut and the hemisphere; and an upper hemisphere $10^a$ secured on the vent tube 9 by means of a nut 13, a washer 14 being provided between it and the said hemisphere. The opposed edges of the two hemispheres are secured by nutted bolts as seen at 15, a washer 16 being interposed between said edges. The nuts 11 and 13 can be turned toward each other to make the joint of the meeting edges of the hemispheres tight.

17 designates a gas burner. This burner is of hemispherical form and arranged chiefly below the center of the inner sphere and it is perforated all over its surface so as to direct jets of flame as effectively and as equally as practicable with such construction toward a large portion of the interior of the inner sphere. The burner is provided with a tube $17^a$ and mixer $17^b$. The burner 17 is supplied with fuel gas through a pipe 18 passed through the tubular standard and terminating in the mixer $17^b$ and at a plane opposite the lateral openings of the tubular openings of the tubular standard and below the burner tube so that air shall be mixed with the gas to insure its effective combustion.

19 designates a nipple for connecting a flexible hose to supply gas.

20 designates a cold water supply pipe connected with the upper portion of the device and 21 a hot water discharge connected with the lower portion of the device, the latter provided with a valve at 22 to control the discharge of heated water.

In addition to being a quick heater the device can be readily taken apart for clearing it of incrustation precipitated from the water. The device as shown is portable but it can be installed as a fixture. With such a device it is not necessary to maintain a fire to keep a ready supply of hot water as water can be sufficiently heated as it flows through the device from the cold water supply to the discharge, the temperature of the water obtained being regulated by the heat supplied at the burner.

What I claim is:

1. A water heater comprising, in combination, two spheres of thin sheet-like metal arranged one concentrically within the other to form a thin sheet like water chamber between them, tubular bosses connecting said metallic spheres and forming air passages into and out of the inner sphere, a gas burner located within the interior of the inner metallic sphere so as to be surrounded at the sides and above and below by the water chamber, water supply and discharge conductors for the water chamber, and a gas supply conductor for the burner.

2. A water heater comprising, in combination, two spheres of thin sheet-like metal arranged one concentrically within the other to form a thin sheet-like water chamber between them, tubular bosses connecting said metallic spheres and forming air passages into and out of the inner sphere, a hemispherical gas burner in the interior of the inner metallic sphere surrounded above and below by the water chamber, water supply and discharge conductors for the water chamber, and a gas supply conductor for the burner.

LUTHER C. RHEA.

Witnesses:
BENJ. FINCKEL,
MAYME FOARD.